(12) United States Patent
Sokolic et al.

(10) Patent No.: US 7,657,761 B2
(45) Date of Patent: Feb. 2, 2010

(54) MULTIPLE TRUST MODES FOR HANDLING DATA

(75) Inventors: Jeremy N. Sokolic, New York, NY (US); Sanjeev Dheer, Scarsdale, NY (US); Venkatachari Dilip, Cupertino, CA (US)

(73) Assignee: CashEdge, Inc., New York, NY (US)

( * ) Notice: Subject to any disclaimer, the term of this patent is extended or adjusted under 35 U.S.C. 154(b) by 175 days.

(21) Appl. No.: 11/714,627

(22) Filed: Mar. 5, 2007

(65) Prior Publication Data

US 2007/0162769 A1 Jul. 12, 2007

Related U.S. Application Data

(63) Continuation of application No. 10/044,289, filed on Jan. 11, 2002, now Pat. No. 7,203,845.

(51) Int. Cl.
*H04L 9/00* (2006.01)
*H04K 1/00* (2006.01)
*G06F 15/16* (2006.01)
*G06F 21/24* (2006.01)

(52) U.S. Cl. .......................... 713/194; 713/166; 705/64
(58) Field of Classification Search ........................ None
See application file for complete search history.

(56) References Cited

U.S. PATENT DOCUMENTS

| | | | |
|---|---|---|---|
| 4,346,442 A | 8/1982 | Musmanno | |
| 4,694,397 A | 9/1987 | Grant et al. | |
| 5,481,720 A | 1/1996 | Loucks et al. | |
| 5,644,727 A | 7/1997 | Atkins | |
| 5,745,706 A | 4/1998 | Wolfberg et al. | |
| 5,787,427 A | 7/1998 | Benantar et al. | |
| 5,805,719 A | 9/1998 | Pare, Jr. et al. | |
| 5,826,243 A | 10/1998 | Musmanno et al. | |
| 5,855,020 A | 12/1998 | Kirsch | |
| 5,884,285 A | 3/1999 | Atkins | |
| 5,893,078 A | 4/1999 | Paulson | |
| 5,895,838 A | 4/1999 | Harjunmaa et al. | |
| 5,940,809 A | 8/1999 | Musmanno et al. | |
| 6,012,048 A | 1/2000 | Gustin et al. | |
| 6,018,722 A | 1/2000 | Ray et al. | |

(Continued)

FOREIGN PATENT DOCUMENTS

GB 2392262 A 2/2004

(Continued)

OTHER PUBLICATIONS

Dartmouth Research & Consulting Glossaries, 2000 (pp. 1-9).

(Continued)

*Primary Examiner*—Christopher A Revak
(74) *Attorney, Agent, or Firm*—Courtney Staniford & Gregory LLP

(57) ABSTRACT

A user is presented with multiple modes of operation, such that the multiple modes of operation define different trust options for handling data (such as login credentials or other sensitive data) associated with the user. A selection of one of the multiple modes of operation is received from the user. Data associated with the user is handled in accordance with the selected mode of operation.

9 Claims, 7 Drawing Sheets

U.S. PATENT DOCUMENTS

| | | | |
|---|---|---|---|
| 6,038,603 | A | 3/2000 | Joseph |
| 6,058,378 | A | 5/2000 | Clark et al. |
| 6,108,641 | A | 8/2000 | Kenna et al. |
| 6,108,788 | A | 8/2000 | Moses et al. |
| 6,199,077 | B1 | 3/2001 | Inala et al. |
| 6,226,623 | B1 | 5/2001 | Schein et al. |
| 6,240,399 | B1 | 5/2001 | Frank et al. |
| 6,317,783 | B1 | 11/2001 | Freishtat et al. |
| 6,321,334 | B1 | 11/2001 | Jerger et al. |
| 6,324,523 | B1 | 11/2001 | Killeen, Jr. et al. |
| 6,374,231 | B1 | 4/2002 | Bent et al. |
| 6,381,592 | B1 | 4/2002 | Reuning |
| 6,405,245 | B1 | 6/2002 | Burson et al. |
| 6,412,073 | B1 | 6/2002 | Rangan |
| 6,473,800 | B1 | 10/2002 | Jerger et al. |
| 6,510,451 | B2 | 1/2003 | Wu et al. |
| 6,513,019 | B2 | 1/2003 | Lewis |
| 6,567,850 | B1 | 5/2003 | Freishtat et al. |
| 6,594,766 | B2 | 7/2003 | Rangan et al. |
| 6,598,028 | B1 | 7/2003 | Sullivan et al. |
| 6,606,606 | B2 | 8/2003 | Starr |
| 6,609,128 | B1 | 8/2003 | Underwood |
| 6,633,910 | B1 | 10/2003 | Rajan |
| 6,697,860 | B1 | 2/2004 | Kung |
| 6,721,716 | B1 | 4/2004 | Gross |
| 6,792,082 | B1 | 9/2004 | Levine |
| 6,799,167 | B1 | 9/2004 | Gullen et al. |
| 6,802,042 | B2 | 10/2004 | Rangan et al. |
| 7,013,310 | B2 | 3/2006 | Messing et al. |
| 7,031,939 | B1 | 4/2006 | Gallagher |
| 7,203,845 | B2 * | 4/2007 | Sokolic et al. .............. 713/194 |
| 2002/0010768 | A1 | 1/2002 | Marks et al. |
| 2002/0019753 | A1 | 2/2002 | Boden |
| 2006/0015450 | A1 | 1/2006 | Guck et al. |

FOREIGN PATENT DOCUMENTS

| | | |
|---|---|---|
| JP | 10149404 A | 6/1998 |
| WO | WO 97-19406 A1 | 5/1997 |
| WO | WO 01-88674 A2 | 11/2001 |

OTHER PUBLICATIONS

Bruce Schneier, Applied Cryptography, Second Edition, Protocols, Algorithms, and Source Code in C, pp. 30-32.

* cited by examiner

MULTIPLE TRUST MODES FOR HANDLING DATA

This application is a continuation of U.S. patent application Ser. No. 10/044,289, filed Jan. 11, 2002, now U.S. Pat. No. 7,203,845, which is incorporated herein by reference in its entirety.

TECHNICAL FIELD

The present invention relates to the handling data and, more particularly, to the use of multiple trust modes that define the manner in which certain data is handled.

BACKGROUND

Users that interact with online services that involve, for example, financial data or financial transactions (e.g., accessing financial accounts, or buying or selling goods or services) are often required to provide data to the online service. This data may include bank account numbers, credit card numbers, passwords, and the like. Many existing online services store the data provided by the users of the online services. Some users may not be comfortable with their data being stored by a third party and, as a result, are reluctant to use the online services offered by these third parties. Thus, users are often faced with the decision to allow their data to be stored by a third party or to forego the services offered by the third party.

Similar problems occur with other types of online accounts and online relationships where credentials are issued to a user. With these types of accounts, when the user's credentials are stored, for example, on a server associated with the online account or other online service, those credentials are at risk of being accessed by an unauthorized person, thereby compromising the security of the user's account.

The systems and methods described herein address these and other problems by providing multiple trust modes that allow a user to determine how the user's data is handled.

SUMMARY

The system and methods described herein provide users of online services with multiple options regarding how the user's data is handled. A particular option is selected by each user based on that user's level of trust in the system or organization that is handling the user's data. Certain options allow the system or organization to store the data while other options require the system or organization to avoid persistently storing the data when finished processing the user's request or transaction.

A particular embodiment presents a user with multiple modes of operation. The multiple modes of operation define different trust options for handling sensitive data associated with the user. A selection is received from the user, where the selection is one of the multiple modes of operation. The sensitive data associated with the user is handled in accordance with the selected mode of operation.

In one embodiment, the multiple modes include a low trust option that retrieves sensitive data from the user each time the user requests a service requiring the sensitive data.

In another embodiment, the multiple modes include a moderate trust option that retrieves sensitive data from the user and stores the sensitive data in an encrypted format using a password known only to the user.

In a particular embodiment, the multiple modes include a high trust option that retrieves sensitive data from the user and stores the sensitive data in an encrypted format for future use.

DETAILED DESCRIPTION

Figure 1:
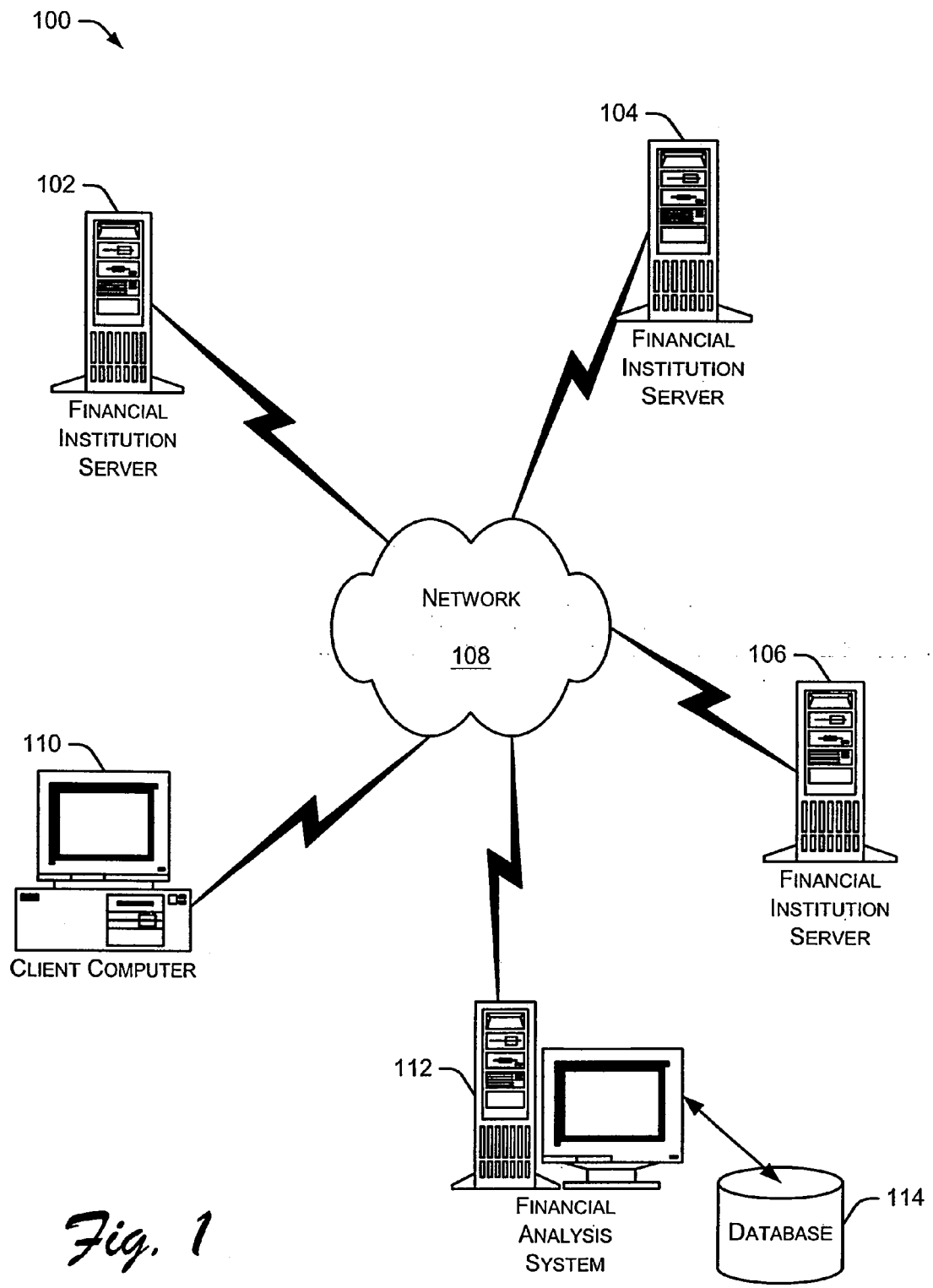
FIG. 1 illustrates an exemplary network environment in which various servers, computing devices, and a financial analysis system exchange data across a network, such as the Internet.

The systems and methods described herein provide various modes of operation that determine how user data is handled. A particular mode of operation is selected by each user based on the user's level of trust in the system or organization that is handling the data. A high level of trust allows the system or organization to store data, such as user credentials and other sensitive data, for later use. A moderate level of trust allows the system or organization to store sensitive data in an encrypted format using a key derived from the user's password (i.e., the user associated with the sensitive data). A low level of trust does not allow the system or organization to store any sensitive data persistently. A user can change the level of trust associated with a particular account to reflect changes in their attitude toward the system or organization.

As used herein, the terms "account holder", "customer", "user", and "client" are interchangeable. "Account holder" refers to any person having access to an account. A particular account may have multiple account holders (e.g., a joint checking account having husband and wife as account holders or a corporate account identifying multiple corporate employees as account holders). Various financial account and financial institution examples are provided herein for purposes of explanation. However, it will be appreciated that the system and procedures described herein can be used with any type of asset account, any type of debt account, and any type of financial institution. Example asset accounts include savings accounts, money market accounts, checking accounts (both interest-bearing and non-interest-bearing), certificates of deposit (CDs), mutual funds, bonds, and equities. Example debt accounts include credit card accounts, mortgage accounts, home equity loans, overdraft protection, margin accounts, personal loans, and other types of loans. Exemplary financial institutions include banks, savings and loans, credit unions, mortgage companies, mutual fund companies, lending companies, and stock brokers.

Various financial account and financial institution examples are provided herein for purposes of explanation. However, the methods and procedures described herein can be applied to any type of transaction involving any type of account. For example, a data aggregation system may aggregate data from multiple sources, such as multiple financial accounts, multiple email accounts, multiple online award (or reward) accounts, multiple news headlines, and the like.

Similarly, the data retrieval and data processing systems and methods discussed herein may be applied to collect data from any type of account containing any type of data. Thus, the methods and systems described herein can be applied to a data aggregation system or any other account management system instead of the financial analysis system discussed in the examples provided herein.

Although particular examples discussed herein refer to the handling of a user's "sensitive data", the methods and systems described herein may be applied to any type of data associated with a user, an organization or other entity.

FIG. 1 illustrates an exemplary network environment 100 in which various servers, computing devices, and a financial analysis system exchange data across a data communication network. The network environment of FIG. 1 includes multiple financial institution servers 102, 104, and 106 coupled to a data communication network 108, such as the Internet. Each of the financial institution servers 102, 104, and 106 are typically associated with a particular financial institution and store data for that financial institution, such as customer account data. As shown in FIG. 1, a client computer 110 and a financial analysis system 112 are also coupled to network 108. A database 114 is coupled to financial analysis system 112 for storing various data used by the financial analysis system.

Network 108 may be any type of data communication network using any communication protocol. Further, network 108 may include one or more sub-networks (not shown) which are interconnected with one another. Although only a few devices are shown coupled to network 108 in FIG. 1, a particular network may include any number of devices coupled to one another.

The communication links shown between the network 108 and the various devices (102-106 and 110-112) shown in FIG. 1 can use any type of communication medium and any communication protocol. For example, one or more of the communication links shown in FIG. 1 may be a wireless link (e.g., a radio frequency (RF) link or a microwave link) or a wired link accessed via a public telephone system or another communication network. Certain devices, such as servers, may be coupled to a local area network (LAN), which is coupled to network 108. Client computer 110 may access network 108 in different ways. First, client computer 110 may directly access network 108, for example, by using a modem to access a public telephone network (e.g., a public switched telephone network (PSTN)) that is coupled to network 108.

Financial analysis system 112 performs various analysis and data integration functions with respect to user accounts. These analysis functions are discussed in greater detail below. Client computer 110 allows a user to access information via the network 108. Client computer may be any type of computing device, such as a laptop computer, desktop computer, personal digital assistant (PDA), cellular phone, or set top box. For example, the user can access account information from one of the financial institution servers 102, 104, or 106, or send a request for an analysis or summary of the user's financial accounts to financial analysis system 112.

In a particular embodiment, the methods and systems described herein provide an Internet-based server solution where the sensitive data of one or more users is stored on a server, not a client.

Figure 2:
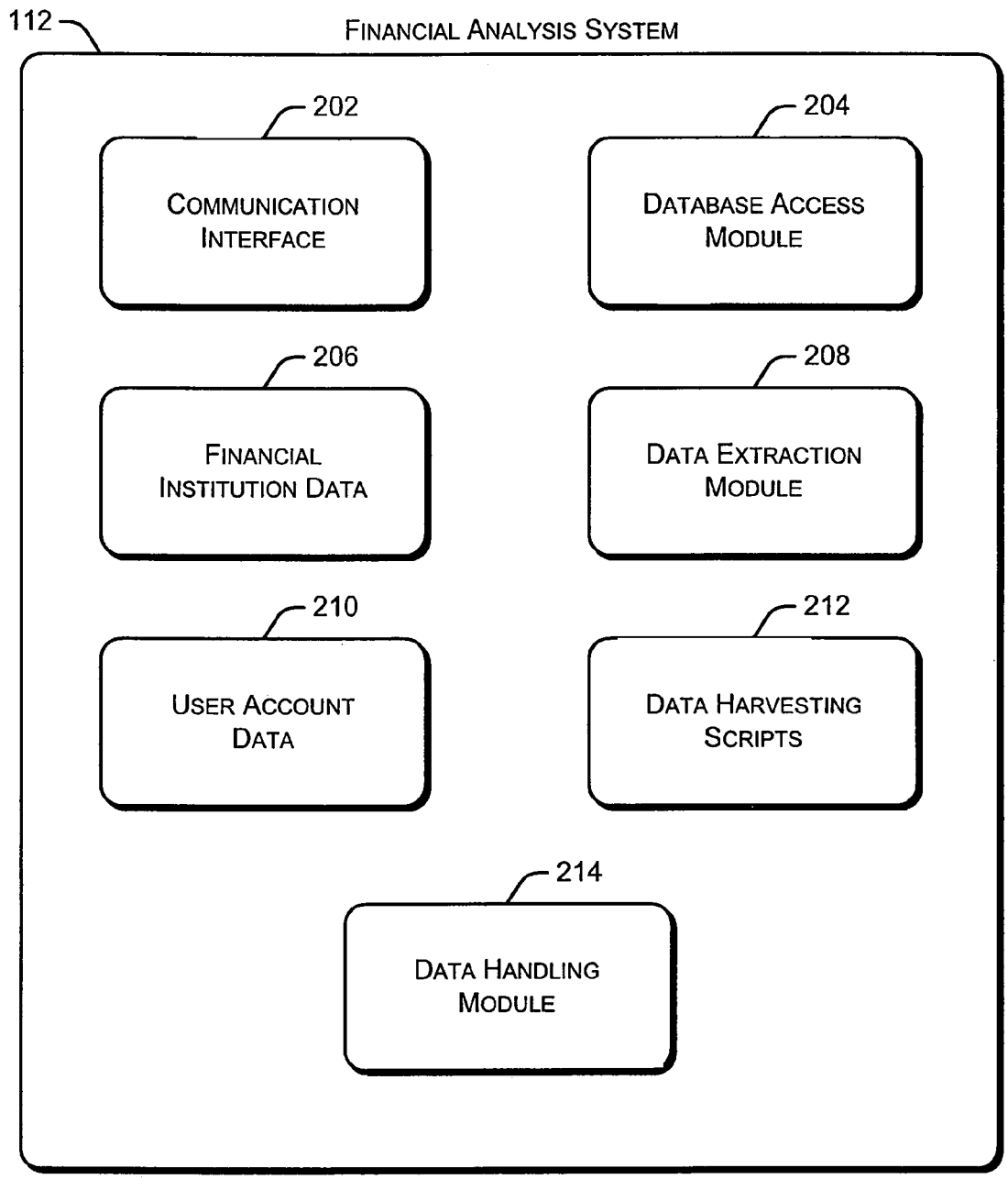
FIG. 2 is a block diagram showing exemplary components and modules of a financial analysis system.

FIG. 2 is a block diagram showing exemplary components and modules of financial analysis system 112. A communication interface 202 allows the financial analysis system 112 to communicate with other devices, such as one or more financial institution servers and client computers. In one embodiment, communication interface 202 is a network interface to a local area network (LAN), which is coupled to another data communication network, such as the Internet.

A database access module 204 allows financial analysis system 112 to store data to database 114 and retrieve data from the database. Financial analysis system 112 also stores various financial institution data 206, which may be used to locate and communicate with various financial institution servers. Financial institution data 206 includes, for example, Uniform Resource Locators (URLs) and login parameters.

A data extraction module 208 retrieves (or extracts) data from web pages or other data sources. The data extraction module 208 may use one or more data harvesting scripts 212 (also referred to as screen scraping scripts) to retrieve data from a web page or other data source. Data harvesting (or screen scraping) is a process that allows a script to retrieve data from one or more web pages associated with a web site. The retrieved data may be stored in a database, such as database 114 (FIG. 1). The data harvesting scripts are capable of navigating web sites and capturing individual HTML pages. Typically, JavaScript and images are removed from the HTML pages or converted into HTML text if it contains account information. A parser then converts the HTML data into a field-delimited XML format. Data is then extracted from the XML format and stored in a database or other storage mechanism.

Financial analysis system 112 also includes user account data 210 and a data handling module 214. User account data 210 typically includes information regarding the types of accounts are maintained by particular users as well as the locations of the accounts (i.e., the financial institution that handles the account) and account balances. The user account data 210 may also indicate the level of trust associated with each user account. User account data 210 may be stored in database 114 coupled to financial analysis system 112. Data handling module 214 determines how account data is handled based on the level of trust associated with the account data and other factors.

Figure 3:
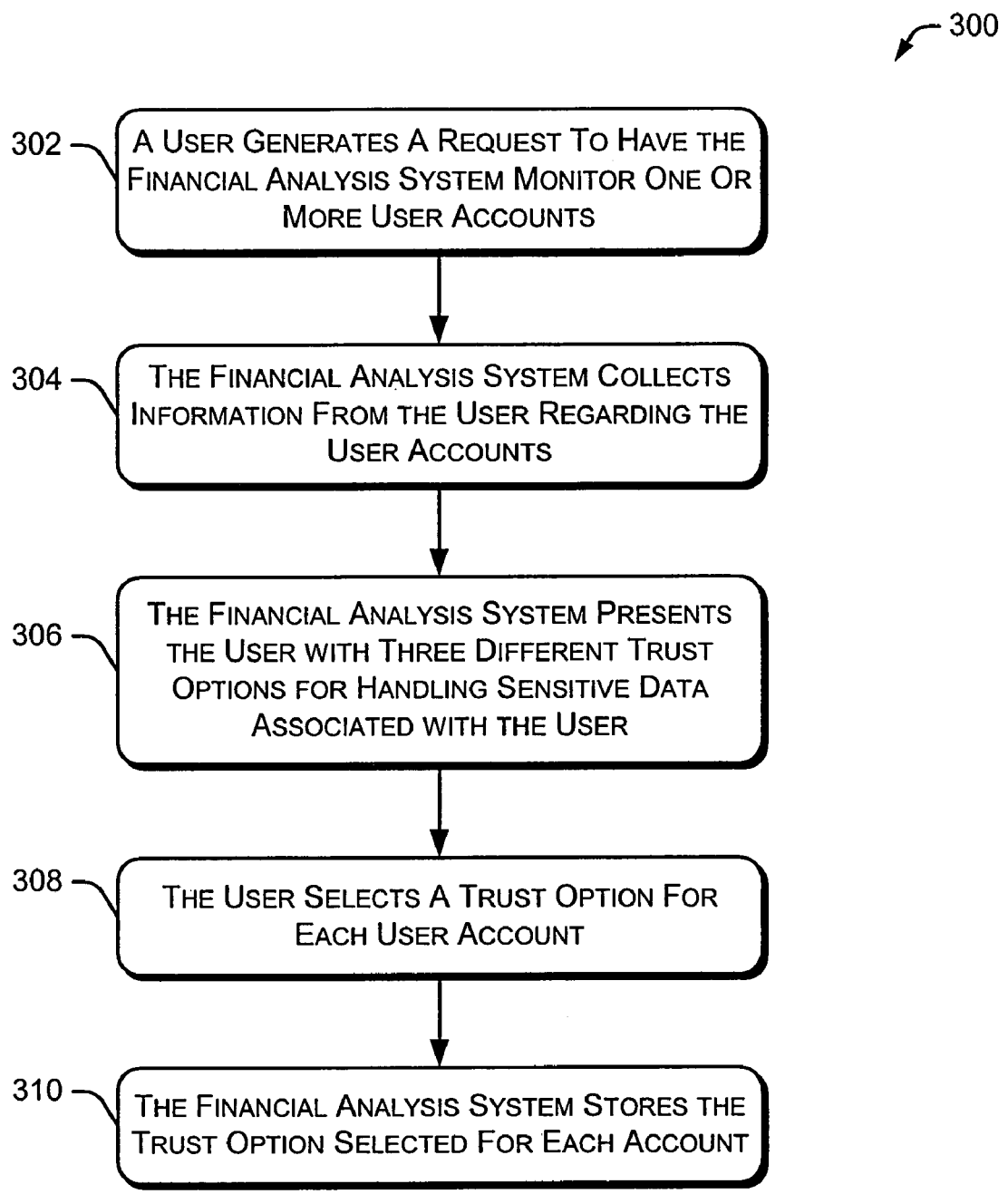
FIG. 3 is a flow diagram illustrating a procedure in which a user registers an account with the financial analysis system.

FIG. 3 is a flow diagram illustrating a procedure 300 in which a user registers an account with the financial analysis system. Initially, a user generates a request to have the financial analysis system monitor one or more of the user's accounts (block 302). The financial analysis system then collects information from the user regarding the user accounts to be monitored (block 304). This information may include, for example, an account number, password to access the account online, the financial institution associated with the account, and the name or names listed on each account. The financial analysis system then presents the user with three different trust options for handling sensitive data associated with the user (block 306). This sensitive data may include, for example, the account number and password used to access the account online. In a particular embodiment, the sensitive data is the user login data (e.g., the username and password used to access an account). Although various examples discussed herein offer three different trust options for handling sensitive data, alternate embodiments may include fewer trust options or a greater number of trust options depending on the preferences of the users and/or the administrators of the financial analysis system.

In a particular embodiment, the three different trust options for handling sensitive data are referred to as "High Trust Option", "Moderate Trust Option", and "Low Trust Option".

High Trust Option

A user selects the High Trust Option if the user is comfortable with having the financial analysis system store the user's sensitive data. When this option is selected, the financial analysis system stores the user's sensitive data for future use, such as automatically updating the user's account balances. The user's sensitive data is stored using a two-way data encryption technique, which allows a user key (derived from the user's password) or a key maintained by the financial analysis system to decrypt the sensitive data. In one embodiment, the user's sensitive data is encrypted using a Triple DES (Data Encryption Standard) algorithm. The Triple DES algorithm is a variation of the DES standard and has been endorsed by the National Institute of Standards and Technology (NIST). Triple DES uses three 64-bit keys, for an overall key length of 192 bits. The encryption procedure is similar to DES, but it is repeated three times. The data is encrypted with the first key, decrypted with the second key, and encrypted again with the third key.

Since the financial analysis system stores the user's account number and password, the system is then able to automatically retrieve the user's account balances using, for example, the data harvesting procedure discussed above.

Moderate Trust Option

A user selects the Moderate Trust Option if they are not comfortable with the High Trust Option, but don't want to have to enter their sensitive information each time they access the financial analysis system. When this option is selected, the financial analysis system stores the user's sensitive information, but the sensitive information is encrypted such that the information can only be decrypted when the user is online (i.e., logged into the financial analysis system). For example, the data can be encrypted using a key derived from the user's password. This encryption technique is referred to as one-way encryption because only one key (associated with the user's password) can decrypt the sensitive data. A particular embodiment of the one-way encryption uses HMAC-MD5. HMAC (Keyed-Hashing Message Authentication) is a mechanism for message authentication using cryptographic hash functions. HMAC can be used with any iterative cryptographic hash function, such as MD5. This combination is referred to as HMAC-MD5. MD5 is a message digest function, which is a function that takes a variable-length message and produces a fixed-length hash. MD5 is an example of a public one-way hash function.

When the user logs into the financial analysis system, the system automatically decrypts the user's sensitive information, which can then be used to retrieve updated information regarding the user's financial accounts.

Low Trust Option

A user selects the Low Trust Option if they are not comfortable with the financial analysis system storing any of the user's sensitive data. When this option is selected, the user's sensitive data is not persistently stored by the financial analysis system. Thus, the user must re-enter the sensitive data each time the user logs into the financial analysis system.

Referring again to FIG. 3, at block 308 the user selects one of the three trust options for each user account. The user may select a different trust option for different accounts or different financial institutions. For example, the user may assign a High Trust Option to a savings account and assign a Moderate Trust Option to a brokerage account. The financial analysis system then stores the selected trust option for each account (block 310). This information is stored, for example, in database 114. The trust option associated with each of the user's institutions can be retrieved from the database each time the user logs into the financial analysis system.

Figure 4:
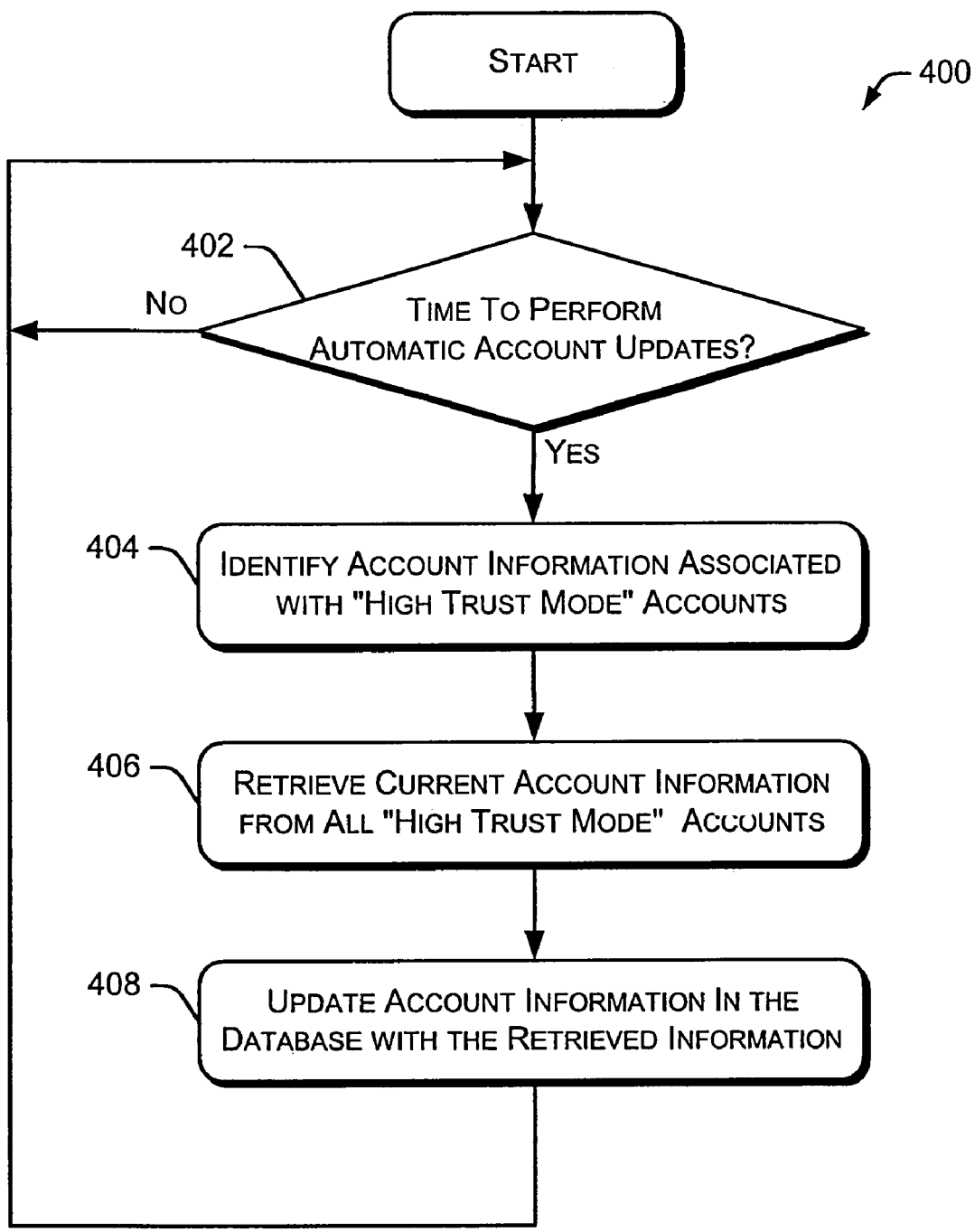
FIG. 4 is a flow diagram illustrating a procedure for automatically updating user accounts having a High Trust Mode of operation.

FIG. 4 is a flow diagram illustrating a procedure 400 for automatically updating user accounts having a High Trust Mode of operation. Initially, the procedure 400 determines whether it is time to perform automatic account updates (block 402). For example, High Trust Mode accounts may be updated automatically each business day. Other accounts may be updated hourly, weekly, monthly, or at other time intervals. In one embodiment, the account updates are performed as batch processes at predetermined times. If one or more automatic account updates are due to be performed, the financial analysis system identifies account information associated with High Trust Mode accounts (block 404). The system then retrieves current account information from all High Trust Mode accounts (block 406), e.g., using the data harvesting procedure discussed above. The system then updates the various account information in the database with the retrieved information (block 408). The procedure then returns to block 402 to await the next automatic account update time. Thus, all user accounts that are designated High Trust Mode are automatically accessed to retrieve current account balances and other information. This retrieved data may be aggregated with data retrieved from other accounts using any data retrieval process.

Figure 5:
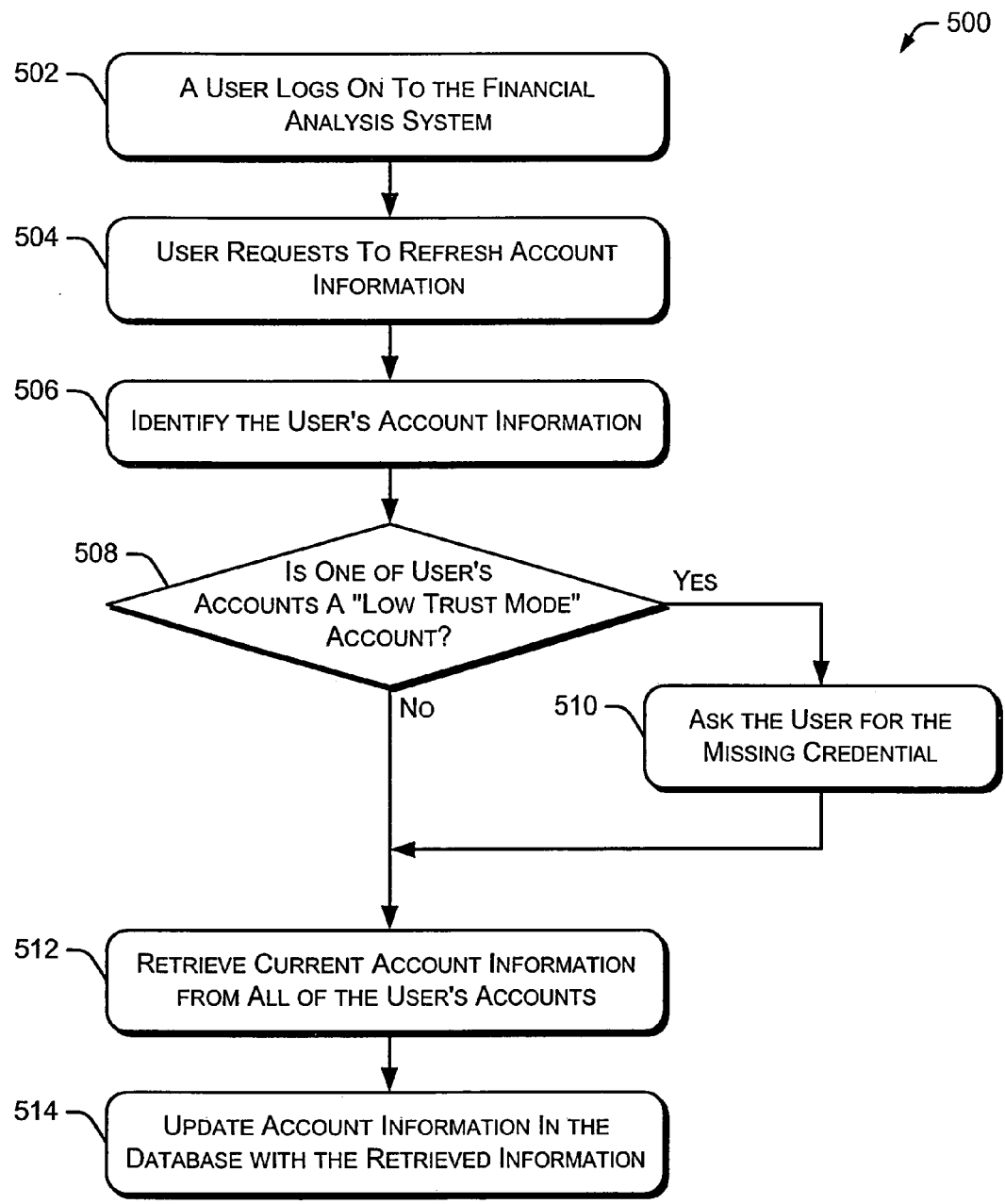
FIG. 5 is a flow diagram illustrating a procedure for updating one or more user accounts.

FIG. 5 is a flow diagram illustrating a procedure 500 for updating one or more user accounts. Initially, a user logs on to the financial analysis system (block 502). The user then requests to refresh account information (block 504). The financial analysis system identifies the user's account information, which includes decrypting the user's sensitive data (block 506). The procedure 500 then determines whether any of the user's accounts are Low Trust Mode accounts (block 508). If at least one of the user's accounts is a Low Trust Mode account, the financial analysis system asks the user for the missing credential (block 510), such as the user's password. As discussed above, the financial analysis system does not store any of the user's sensitive data related to Low Trust Mode accounts. Therefore, the user must provide the user ID and password, and explicitly request that the financial analysis system retrieve the current account information from the Low Trust Mode accounts. In alternate embodiments, the financial analysis system stores the user ID associated with Low Trust Mode accounts, but requires the user to enter the appropriate password each time the account is accessed.

The procedure then retrieves the current account information from all of the user's accounts, including Low Trust Mode accounts, Moderate Trust Mode accounts, and High Trust Mode accounts (block 512). The financial analysis system then updates the account information contained in the database with the retrieved information (block 514). In one embodiment, only Moderate Trust Mode accounts are updated when the user logs on to the financial analysis system. In other embodiments, the financial analysis system may also update the user's High Trust Mode accounts and/or the user's Low Trust Mode accounts.

Figure 6:
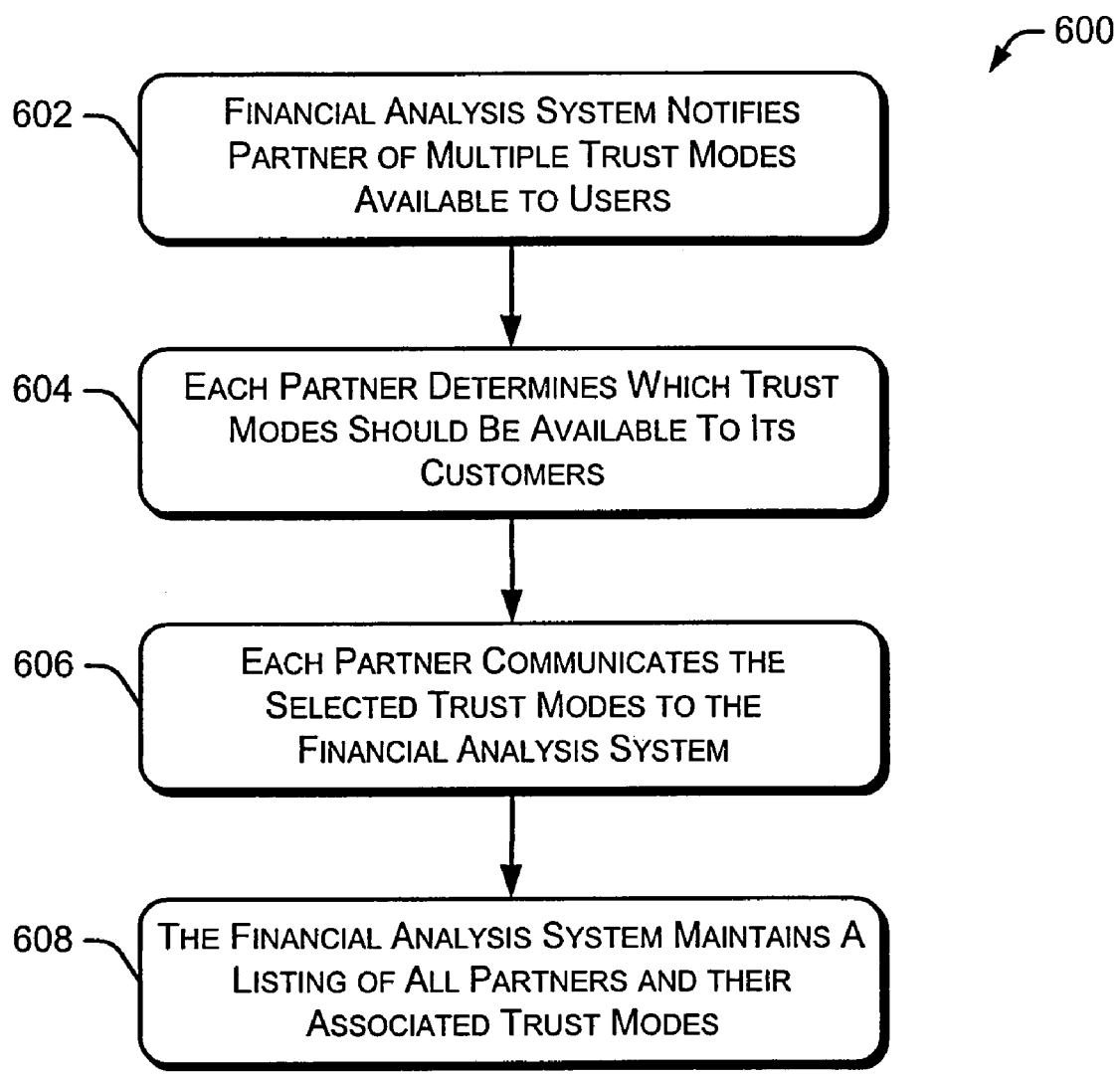
FIG. 6 is a flow diagram illustrating a procedure for allowing financial institutions to select among multiple trust modes that are made available to customers of the financial institutions.

FIG. 6 is a flow diagram illustrating a procedure 600 for allowing partners to select among multiple trust modes that are made available to customers of the partners. A partner may be any organization that implements, for example, the systems described herein. Alternatively, a partner may be an organization that has the various services described herein implemented by another on behalf of the organization. Further, a partner may be an organization that provides a portal to another web site, such as a web site that implements the systems described herein. An organization that hosts a web site having an online registration requirement may also be a partner.

In certain situations, the financial analysis system provides data aggregation functions for one or more partners. These partners may want to limit the number of trust modes that are offered to their customers. Initially, the financial analysis system notifies one or more partners of the multiple trust modes available to users (block 602). Each partner then determines which trust modes should be made available to its customers (block 604). For example, a particular partner might not want to be responsible for storing the user's sensitive data in a two-way encrypted format (High Trust Mode) and doesn't want to offer that option to its customers. Each partner communicates the selected trust modes to the financial analysis system (block 606). The financial analysis system maintains a listing of all partners and their associated trust modes (block 608). This listing may be stored, for example, in database 114 (FIG. 1). Before allowing a user to set up a new account with the financial analysis system, the system first checks to see if the partner associated with the new account (if any) has any restrictions on the types of trust modes available to its customers. If there are restrictions, the customer's choices are limited to those trust modes authorized by the partner.

Figure 7:
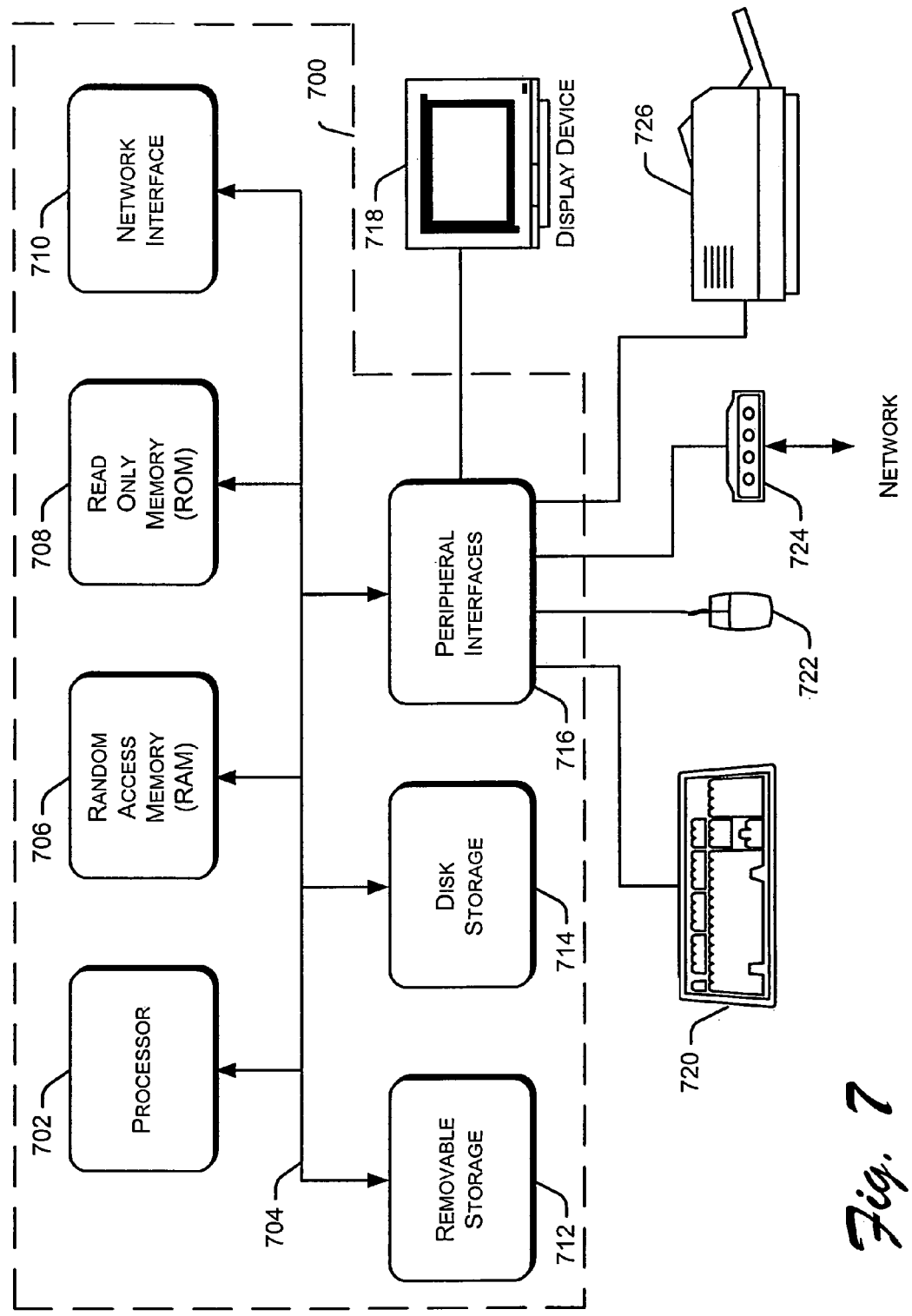
FIG. 7 is a block diagram showing pertinent components of a computer in accordance with the invention.

FIG. 7 is a block diagram showing pertinent components of a computer 700 in accordance with the invention. A computer such as that shown in FIG. 7 can be used, for example, to perform various procedures such as those discussed herein. Computer 700 can also be used to access a web site or other computing facility to access various financial information. The computer shown in FIG. 7 can function as a server, a client computer, or a financial analysis system, of the types discussed herein.

Computer 700 includes at least one processor 702 coupled to a bus 704 that couples together various system components. Bus 704 represents one or more of any of several types of bus structures, such as a memory bus or memory controller, a peripheral bus, and a processor or local bus using any of a variety of bus architectures. A random access memory (RAM) 706 and a read only memory (ROM) 708 are coupled to bus 704. Additionally, a network interface 710 and a removable storage device 712, such as a floppy disk or a CD-ROM, are coupled to bus 704. Network interface 710 provides an interface to a data communication network such as a local area network (LAN) or a wide area network (WAN) for exchanging data with other computers and devices. A disk storage 714, such as a hard disk, is coupled to bus 704 and provides for the non-volatile storage of data (e.g., computer-readable instructions, data structures, program modules and other data used by computer 700). Although computer 700 illustrates a removable storage 712 and a disk storage 714, it will be appreciated that other types of computer-readable media which can store data that is accessible by a computer, such as magnetic cassettes, flash memory cards, digital video disks, and the like, may also be used in the exemplary computer.

Various peripheral interfaces 716 are coupled to bus 704 and provide an interface between the computer 700 and the individual peripheral devices. Exemplary peripheral devices include a display device 718, a keyboard 720, a mouse 722, a modem 724, and a printer 726. Modem 724 can be used to access other computer systems and devices directly or by connecting to a data communication network such as the Internet.

A variety of program modules can be stored on the disk storage 714, removable storage 712, RAM 706, or ROM 708, including an operating system, one or more application programs, and other program modules and program data. A user can enter commands and other information into computer 700 using the keyboard 720, mouse 722, or other input devices (not shown). Other input devices may include a microphone, joystick, game pad, scanner, satellite dish, or the like.

Computer 700 may operate in a network environment using logical connections to other remote computers. The remote computers may be personal computers, servers, routers, or peer devices. In a networked environment, some or all of the program modules executed by computer 700 may be retrieved from another computing device coupled to the network.

Typically, the computer 700 is programmed using instructions stored at different times in the various computer-readable media of the computer. Programs and operating systems are often distributed, for example, on floppy disks or CD-ROMs. The programs are installed from the distribution media into a storage device within the computer 700. When a program is executed, the program is at least partially loaded into the computer's primary electronic memory. As described herein, the invention includes these and other types of computer-readable media when the media contains instructions or programs for implementing the steps described below in conjunction with a processor. The invention also includes the computer itself when programmed according to the procedures and techniques described herein.

For purposes of illustration, programs and other executable program components are illustrated herein as discrete blocks, although it is understood that such programs and components reside at various times in different storage components of the computer, and are executed by the computer's processor. Alternatively, the systems and procedures described herein can be implemented in hardware or a combination of hardware, software, and/or firmware. For example, one or more application specific integrated circuits (ASICs) can be programmed to carry out the systems and procedures described herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:

identifying multiple financial accounts associated with a user, wherein the multiple financial accounts are with a plurality of financial institutions;

presenting the user with a plurality of trust modes, each of which can be associated with one or more of the plurality of financial institutions, wherein each mode directs a server remote from the plurality of financial institutions to handle user data in a particular manner, and wherein the user data comprises user login data used to access accounts online at one of the plurality of financial institutions;

receiving a selection of a trust mode from the user for each of the multiple financial institutions;

associating a selected mode with each of the multiple financial institutions;

storing,
 financial institution data for each of the plurality of financial institutions, comprising data which may be used to locate and communicate with the plurality of financial institutions;
 data identifying the multiple financial accounts; and
 the associated modes; and handling the user data associated with each of the plurality of financial institutions in accordance with an associated trust mode each time one of the multiple financial accounts is accessed, wherein accessing one of the multiple financial accounts comprises a financial analysis system accessing the account on behalf of the user.

2. A method as recited in claim 1 wherein the plurality of trust modes comprises a moderate trust mode that directs the financial analysis system to encrypt the user data, and store the encrypted user data.

3. A method as recited in claim 2 wherein the moderate trust mode directs the financial analysis system to encrypt the user authentication data using one-way encryption.

4. A method as recited in claim 1 wherein the plurality of trust modes comprises a high trust mode that directs the financial analysis system to encrypt the user authentication data using two-way encryption, and store the encrypted user authentication data.

5. A method as recited in claim 1 further comprising associating a default mode with each of the multiple financial accounts if the user does not select a valid trust mode.

6. A method for analyzing financial data, the method comprising:
- a processor-based financial analysis system receiving a user request to monitor a plurality of user accounts;
- the system receiving account access information from the user regarding each of the user accounts via a network, wherein the account access information comprises user authentication data;
- the system receiving a selection of one of a plurality of trust modes from the user for each of the plurality of accounts, wherein each trust mode directs the financial analysis system to handle the user authentication data in a specified manner; and
- the system automatically monitoring the plurality of user accounts via the network, comprising,
  - accessing the user accounts using the received account access information; and
  - retrieving current account information regarding the user accounts.

7. The method of claim 6, wherein the plurality of trust modes comprises at least one high trust mode that implies the user has granted automatic access to a user account.

8. The method of claim 6, wherein the plurality of trust modes comprises at least one low trust mode, wherein accessing a user account using the received account access information and a low trust mode comprises:
- asking the user for a missing credential; and
- retrieving current account information regarding the user account when the missing credential has been supplied.

9. The method of claim 6, further comprising:
- notifying a plurality of financial institutions of the availability of the plurality of trust modes;
- each of the plurality of financial institutions choosing at least one of the trust modes to make available to a user, wherein the user is a customer of a financial institution; and
- maintaining a list comprising each of the plurality of financial institutions and respective trust modes chosen by each of the plurality if financial institutions.

* * * * *